United States Patent
Yang et al.

(10) Patent No.: US 8,131,911 B2
(45) Date of Patent: Mar. 6, 2012

(54) DATA WRITING METHOD, AND FLASH STORAGE SYSTEM AND CONTROLLER USING THE SAME

(75) Inventors: Jiunn-Yeong Yang, Keelung (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 586 days.

(21) Appl. No.: 12/147,969

(22) Filed: Jun. 27, 2008

(65) Prior Publication Data
US 2009/0265505 A1    Oct. 22, 2009

(30) Foreign Application Priority Data
Apr. 18, 2008 (TW) .............................. 97114252 A

(51) Int. Cl.
G06F 12/02 (2006.01)
(52) U.S. Cl. ....................................................... 711/103
(58) Field of Classification Search ........................ None
See application file for complete search history.

(56) References Cited

U.S. PATENT DOCUMENTS

| | | | |
|---|---|---|---|
| 2005/0030791 A1* | 2/2005 | Liang et al. | 365/185.11 |
| 2006/0004971 A1* | 1/2006 | Kim et al. | 711/154 |
| 2008/0037321 A1* | 2/2008 | Luo et al. | 365/185.03 |
| 2008/0046639 A1* | 2/2008 | Tsuji | 711/103 |
| 2008/0104309 A1* | 5/2008 | Cheon et al. | 711/103 |
| 2008/0189490 A1* | 8/2008 | Cheon et al. | 711/144 |
| 2008/0195804 A1* | 8/2008 | Kim et al. | 711/103 |
| 2008/0222350 A1* | 9/2008 | Chang | 711/103 |
| 2009/0049229 A1* | 2/2009 | Honda et al. | 711/101 |
| 2009/0157974 A1* | 6/2009 | Lasser | 711/135 |

FOREIGN PATENT DOCUMENTS
EP        1895418        3/2008

* cited by examiner

Primary Examiner — Kaushikkumar Patel
(74) Attorney, Agent, or Firm — J.C. Patents

(57) ABSTRACT

A data writing method, and a flash storage system and a controller using the same are provided. The method includes grouping the physical blocks of a flash memory into the physical blocks of a data area, a spare area and a special area. The method also includes writing the update data into the corresponding physical block of the special area when the update data is the single accessing unit. The method may include moving a part of valid data in a physical block mapping a logical block where the update data is belonged into a physical block of the spare area during each data writing command. Accordingly, it is possible to reduce the response time for each data writing command, thereby preventing a time-out problem caused by a flash memory having a large erasing unit configured at the flash storage system.

23 Claims, 6 Drawing Sheets

DATA WRITING METHOD, AND FLASH STORAGE SYSTEM AND CONTROLLER USING THE SAME

CROSS-REFERENCE TO RELATED APPLICATION

This application claims the priority benefit of Taiwan application serial no. 97114252, filed on Apr. 18, 2008. The entirety of the above-mentioned patent application is hereby incorporated by reference herein and made a part of specification.

BACKGROUND

1. Technology Field

The present invention relates to a data writing method. More particularly, the present invention relates to a data writing method for a flash memory, and a flash storage system and a controller using the same.

2. Description of Related Art

With a quick developing of digital camera, cell phone camera and MP3, demand of storage media by customers is increased greatly. Since a flash memory has the advantages of non-volatile, energy saving, small size and none mechanical structure etc., it is suitable for portable applications, and especially for portable battery-powered products. A memory card is a storage device applying an NAND flash memory as the storage media. Since the memory card has a small size and a large volume, and is easy to be carried, it has been widely used for storing important personal data. Therefore, the flash drive industry becomes a hot industry within the electronics industry recently.

Generally, in the flash memory, a programming unit (for example, a page) is less than an erasing unit (for example, a block). Therefore, when update data is written into the flash memory, moving of valid data therein is required to be performed. With progress of fabrication process of the flash memory, and to satisfy a large volume of the storage media, design capacities of each programming unit and erasing unit become greater, which may lead to a fact that more time is required to move valid data in the erasing unit. However, for a flash memory having a large erasing unit, response time for a data writing command may exceed that of some latest flash storage systems (for example a solid state drive (SSD)) due to excessive block moving time, and therefore the flash memory having the large erasing unit cannot be used. Accordingly, the response time for each data writing command of the flash storage system is required to be shortened.

SUMMARY

The present invention is directed to a data writing method, by which a response time corresponding to an operation of writing data into a flash memory may be shortened, so as to prevent a time-out problem.

The present invention is directed to a flash storage system, in which data writing steps applied therein may shorten a response time corresponding to an operation of writing data into a flash memory, so as to prevent a time-out problem.

The present invention is directed to a controller, which may performs data writing steps to a flash memory to shorten a response time corresponding to an operation of writing data into a flash memory, so as to prevent a time-out problem.

The present invention provides a data writing method for a host to write data to a flash memory of a flash storage system, wherein the flash memory may be divided into a plurality of physical blocks for alternately mapping a plurality of logical blocks provided by the flash storage system for the host to access. The data writing method includes logically dividing the physical blocks of the flash memory into a data area, a spare area and a special area, and judging whether or not update data to be written into the logical blocks by the host is a single accessing unit according to a data writing command received from the host, wherein if the update data is the single accessing unit, the update data is then written into a corresponding physical block of the special area.

In an embodiment of the present invention, the data writing method further includes selecting a physical block from the spare area to be a new mapping physical block of the logical block mapped to the update data, and moving valid old data mapping the logical block in the data area and the update data mapping the logical block in the special area to the selected physical block, wherein only a part of the valid old data and the update data mapping the logical block are moved during the data writing command is performed. The data writing method further includes erasing the update data mapping the logical block from the physical block of the special area after the valid old data and the update data mapping the logical block are moved.

In an embodiment of the present invention, the data writing method further includes judging whether or not there are multiple update data mapping a same logical block in the physical block of the special area, and selecting a physical block from the spare area to be a new mapping physical block of the same logical block, and moving valid old data mapping the same logical block in the data area and the multiple update data mapping the same logical block in the special area to the selected physical block if there are multiple update data mapping the same logical block in the physical block of the special area, wherein only a part of the valid old data and the update data mapping the same logical block are moved during the data writing command is performed. The data writing method further includes erasing the multiple update data mapping the same logical block from the physical block of the special area after the valid old data and the update data mapping the same logical block are moved.

In an embodiment of the present invention, the step of writing the update data to the physical block of the special area includes only writing the update data into a lower page of the physical block of the special area when the flash memory is an multi level cell (MLC) NAND flash memory.

In an embodiment of the present invention, the single accessing unit is a sector.

In an embodiment of the present invention, the data writing method further includes recording a mapping relation between the logical blocks and the corresponding physical block of the special area in a valid data mapping table, wherein the mapping relation represents a plurality of logical blocks maps to a physical block.

In an embodiment of the present invention, the step of moving valid old data mapping the same logical block in the data area and the multiple update data mapping the same logical block in the special area to the selected physical block is starting from a start address of the logical block or a specific address of the logical block.

The present invention provides a controller for a flash storage system having a flash memory, wherein the flash memory is divided into a plurality of physical blocks for alternately mapping a plurality of logical blocks provided by the flash storage system for a host to access. The controller includes a microprocessor, a buffer memory, a flash memory interface and a memory management module. The microprocessor is used for receiving data writing commands of the host. The buffer memory is coupled to the microprocessor, and is used for temporarily storing data. The flash memory interface is coupled to the microprocessor, and is used for accessing the flash memory. The memory management module is coupled to the microprocessor, and is used for executing a plurality of data writing steps, wherein the data writing steps include logically dividing the physical blocks of the flash memory into a data area, a spare area and a special area, and judging whether update data to be written into the physical block by the host is a single accessing unit according to the data writing command, wherein the update data is then written into the corresponding physical block of the special area via the flash memory interface if the update data is the single accessing unit.

In an embodiment of the present invention, the data writing steps further include selecting a physical block from the spare area to be a new mapping physical block of the logical block mapped to the update data, and moving valid old data mapping the logical block in the data area and the update data mapping the logical block in the special area to the selected physical block, wherein only a part of the valid old data and the update data mapping the logical block are moved during the data writing command is performed. The data writing steps further include erasing the update data mapping the logical block from the physical block of the special area after the valid old data and the update data mapping the logical block are moved.

In an embodiment of the present invention, the data writing steps further include judging whether or not there are multiple update data mapping a same logical block in the physical block of the special area, and selecting a physical block from the spare area to be a new mapping physical block of the same logical block, and moving valid old data mapping the same logical block in the data area and the multiple update data mapping the same logical block in the special area to the selected physical block if there are multiple update data mapping the same logical block in the physical block of the special area, wherein only a part of the valid old data and the update data mapping the same logical block are moved during the data writing command is performed. The data writing steps further include erasing the multiple update data mapping the same logical block from the physical block of the special area after the valid old data and the update data mapping the same logical block are moved.

In an embodiment of the present invention, the flash memory is a single level cell (SLC) NAND flash memory or an MLC NAND flash memory.

In an embodiment of the present invention, the data writing steps further include only writing the update data into a lower page of the physical block of the special area when the flash memory is the MLC NAND flash memory.

In an embodiment of the present invention, the flash memory flash storage system is a flash drive, a memory card or a SSD.

In an embodiment of the present invention, the data writing steps further include recording a mapping relation between the logical blocks and the corresponding physical block of the special area in a valid data mapping table, wherein the mapping relation represents a plurality of logical blocks maps to a physical block.

In an embodiment of the present invention, the step of moving valid old data mapping the same logical block in the data area and the multiple update data mapping the same logical block in the special area to the selected physical block is starting from a start address of the logical block, or from a specific address of the logical block.

The present invention provides a flash storage system including a transmission interface, a flash memory and a controller. The transmission interface is used for connecting a host. The flash memory has a plurality of physical blocks for alternately mapping a plurality of logical blocks provided for the host to access. The controller is coupled to the transmission interface and the flash memory, and is used for performing a plurality of data writing steps, wherein the data writing steps include logically dividing the physical blocks of the flash memory into a data area, a spare area and a special area, and judging whether or not update data to be written into the physical block by the host is a single accessing unit according to a data writing command received from the host, wherein if the update data is the single accessing unit, the update data is then written into the corresponding physical block of the special area.

In an embodiment of the present invention, the data writing steps further include selecting a physical block from the spare area to be a new mapping physical block of the logical block mapped to the update data, and moving valid old data mapping the logical block in the data area and the update data mapping the logical block in the special area to the selected physical block, wherein only a part of the valid old data and the update data mapping the logical block are moved during the data writing command is performed. The data writing steps further include erasing the update data mapping the logical block from the physical block of the special area after the valid old data and the update data mapping the logical block are moved.

In an embodiment of the present invention, the data writing steps further include judging whether or not there are multiple update data mapping a same logical block in the physical block of the special area, and selecting a physical block from the spare area to be a new mapping physical block of the same logical block, and moving valid old data mapping the same logical block in the data area and the multiple update data mapping the same logical block in the special area to the selected physical block if there are multiple update data mapping the same logical block in the physical block of the special area, wherein only a part of the valid old data and the update data mapping the same logical block are moved during the data writing command is performed. The data writing steps further include erasing the multiple update data mapping the same logical block from the physical block of the special area after the valid old data and the update data mapping the same logical block are moved.

In an embodiment of the present invention, the flash memory is an SLC NAND flash memory or an MLC NAND flash memory.

In an embodiment of the present invention, the data writing steps further include only writing the update data into a lower page of the physical block of the special area when the flash memory is the MLC NAND flash memory.

In an embodiment of the present invention, the transmission interface is a PCI express interface, a USB interface, an IEEE 1394 interface, an SATA interface, an MS interface, an MMC interface, an SD interface, a CF interface or an IDE interface.

In an embodiment of the present invention, the data writing steps further include recording a mapping relation between the logical blocks and the corresponding physical block of the special area in a valid data mapping table, wherein the mapping relation represents a plurality of logical blocks maps to a physical block.

In an embodiment of the present invention, the step of moving valid old data mapping the same logical block in the data area and the multiple update data mapping the same logical block in the special area to the selected physical block is starting from a start address of the logical block, or from a specific address of the logical block.

In the present invention, the special area is applied for temporally writing the update data which belongs to the single accessing unit, and the valid data in the physical block is moved separately. Therefore, the response time for each data writing command may be shortened, so as to prevent a time-out problem possibly occurred in a flash storage system including a flash memory having a large erasing unit.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

According to a data writing method for a flash memory provided by the present invention, when a host sends a data writing command, update data with a data length thereof being a single accessing unit is first written into a physical block of a special area designed in the flash memory, and only a part of valid data is moved for a physical block mapping a logical block to be written with the update data during each data writing command. Namely, movements of the valid data in the physical block mapping the logical block to be written with the update data are performed in multi-batches method according to a plurality of the data writing commands, so as to shorten a response time of the flash storage system for each data writing command. In the following content, embodiments of the present invention are described in detail with reference of figures.

[First Embodiment]

Figure 1:
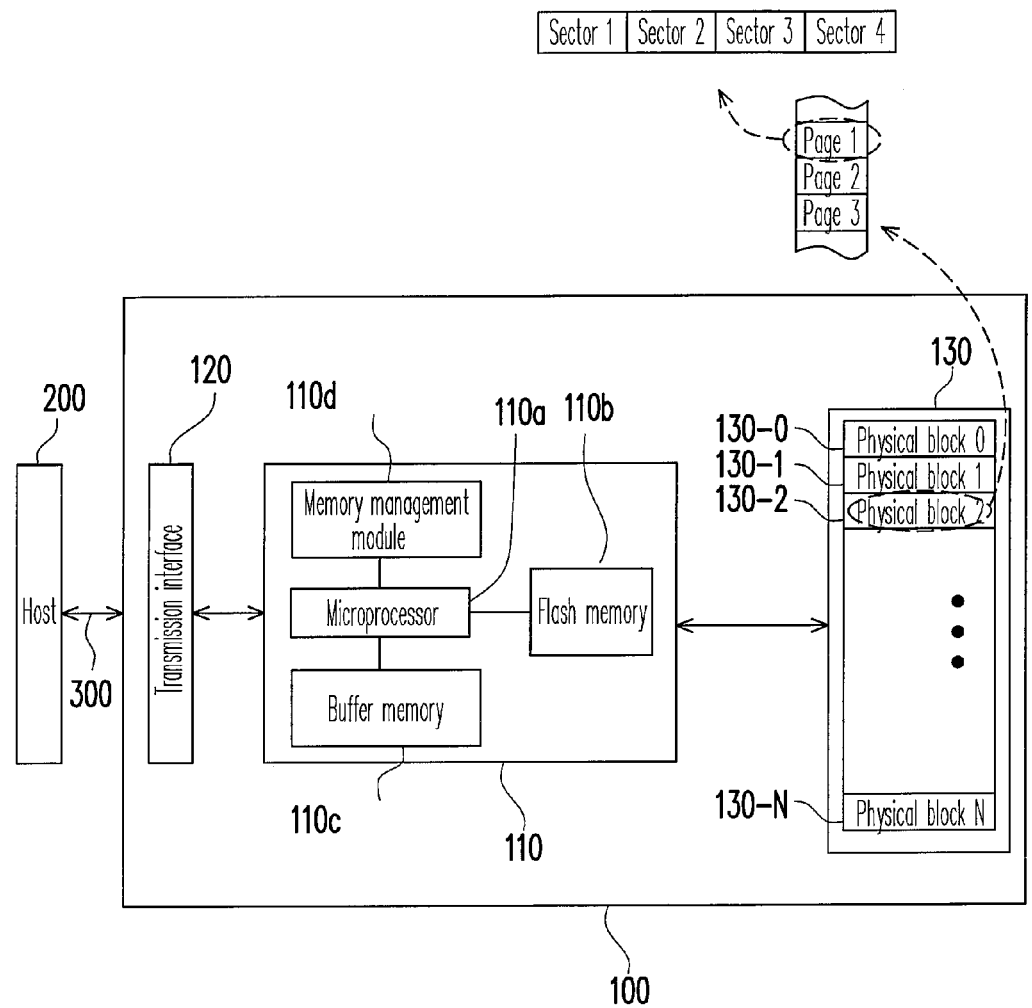
FIG. 1 is a block diagram illustrating a flash storage system according to a first embodiment of the present invention.

FIG. 1 is a block diagram illustrating a flash storage system according to a first embodiment of the present invention. Referring to FIG. 1, a flash storage system 100 includes a controller 110, a transmission interface 120 and a flash memory 130. Generally, the flash storage system 100 is utilized together with a host 200, so that the host 200 may write data into the flash storage system 100 or read data from the flash storage system 100. In the present invention, the flash storage system 100 is a solid state drive (SSD). It should be noted that in another embodiment of the present invention, the flash storage system 100 may also be a memory card or a flash drive.

The controller 110 may operate with the transmission interface 120 and the flash memory 130 to accomplish all operations of the flash storage system 100, for example, data storage, data reading or data erasing, etc. The controller 110 includes a microprocessor 110a, a flash memory interface 110b, a buffer memory 110c and a memory management module 110d.

The microprocessor 110a may work in coordination with the flash memory interface 110b, the buffer memory 110c and the memory management module 110d. To be specific, the microprocessor 110a may send a data writing command, a data reading command, etc. for coordinating the flash memory interface 110b, the buffer memory 110c and the memory management module 110d to perform operations of writing, reading and erasing, etc.

The flash memory interface 110b is electrically connected to the microprocessor 110a and is used for accessing the flash memory 130. Namely, data to be written into the flash memory 130 by the host 200 is transformed into a format that may be accepted by the flash memory 130 by the flash memory interface 110b.

The buffer memory 110c is electrically connected to the microprocessor 110a, and is used for temporarily storing system data (for example, a mapping table recording a mapping relationship between logical blocks and physical blocks) or data to be read or written by the host 200. In the present embodiment, the buffer memory 110c is a static random access memory (SRAM). However, it should be noted that the present invention is not limited thereto, and a dynamic random access memory (DRAM), a magnetoresistive random access memory (MRAM), a phase change random access memory (PRAM) or other suitable memories may also be applied.

The memory management module 110d is electrically connected to the microprocessor 110a, and is used for managing the flash memory 130 according commands sent from the microprocessor 110a, for example, executing a wear levelling procedure, managing damaged blocks, maintaining a mapping table etc. Especially, in the present embodiment, the memory management module 110d may execute data writing steps according to the present embodiment (shown as FIG. 3). It should be noted that in the present embodiment, the memory management module 110d is implemented in a hardware mode, though it may also be implemented in a software mode.

Moreover, though not illustrated, the controller 110 may further includes common functional modules of a general flash memory controller, for example, an error correction module and a power management module, etc.

The transmission interface 120 is used for connecting the host 200 via a bus 300. In the present embodiment, the transmission interface 120 is a PCI express interface. However, it should be noted that the present invention is not limited thereto, and the transmission interface 120 may also be a USB interface, an IEEE 1394 interface, a SATA interface, a PCI Express interface, an MS interface, an MMC interface, an SD interface, a CF interface and an IDE interface, or other suitable data transmission interfaces.

The flash memory 130 is coupled to the controller 110 and is used for storing data. In the present embodiment, the flash memory 130 is a multi level cell (MLC) NAND flash memory. However, it should be noted that the present invention is not limited thereto, and in another embodiment of the present invention, a single level cell (SLC) NAND flash memory may also be applied.

The flash memory 130 is generally divided into a plurality of physical blocks 130-0~130-N. Generally, the physical block is a minimum unit that may be erased within the flash memory. Namely, each physical block contains a minimum number of memory cells that may be erased together. Each physical block is generally divided into a plurality of pages. In the present embodiment, the page of the flash memory 130 is 8K bytes. However, the present invention is not limited thereto, and the flash memory with a page thereof being 4K bytes or other units may also be applied.

Generally, the physical block may include arbitrary number of pages, for example, 64 pages, 128 pages, 256 pages, etc. The physical blocks 130-0~130-N are generally grouped into a plurality of zones, and managing of the memory based on the zones results in the fact that the zones may be operated independently, so as to increase a parallel degree of operation, and simplify a complexity of management.

To operate in coordination with a size of the sector of the disk drive, one page is generally one sector. However, the page may also include a plurality of the sectors, for example, one page may include 4 sectors. In the present embodiment, one page of the flash memory 130 includes a plurality of sectors (for example, 4 sectors). In the present embodiment, a sector is the minimum programmable unit for the flash memory 130. However, the present invention is not limited thereto, and a flash storage system with a page thereof being the minimum programmable unit may also be applied.

Operation of the flash memory will now be described more fully with reference to the accompanying drawings. It should be understood that the terms used herein such as "select", "move", "exchange" etc; for operating the blocks of the flash memory are only logical concepts. Namely, the blocks of the flash memory are only operated logically, and actual positions of the blocks are not changed.

Figure 2:
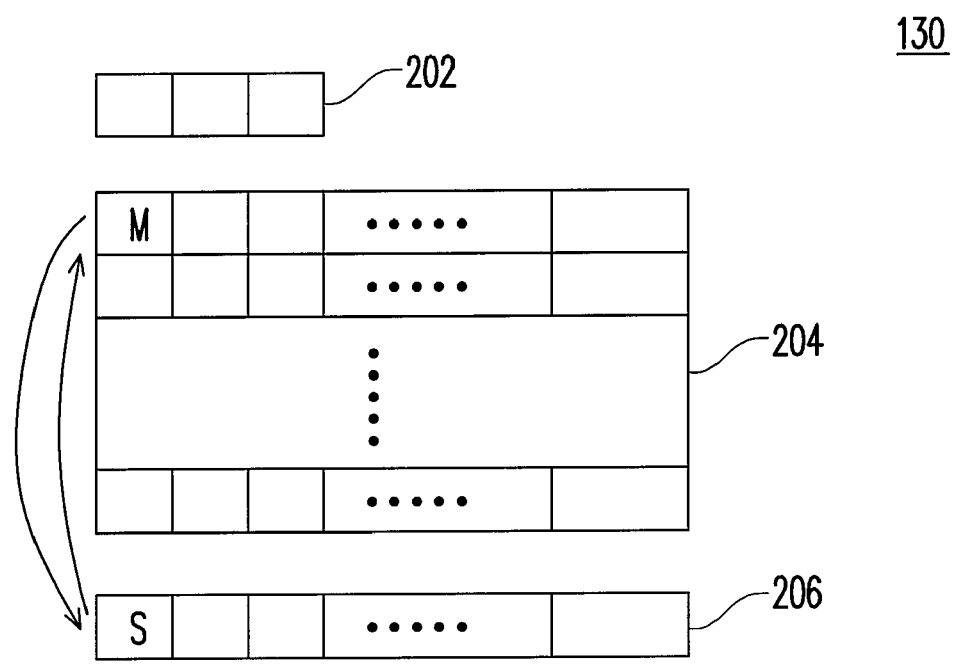
FIG. 2 is a schematic diagram illustrating a flash memory and an operation thereof according to a first embodiment of the present invention.

FIG. 2 is a schematic diagram illustrating a flash memory 130 and an operation thereof according to a first embodiment of the present invention.

Referring to FIG. 2, in the present embodiment, to effectively write and erase the flash memory 130, the physical blocks 130-1~130-N of the flash memory 130 may be logically grouped into a data area 204, a spare area 206 and a special area 202. Generally, the data area 204 may occupy more than 90% area of the flash memory 130.

The physical blocks of the data area 204 are used for storing data, which are generally the blocks mapping to the logical blocks operated by the host 200. To be specific, the flash storage system 100 provides the logical blocks as accessing addresses to the host 200, and the physical blocks in the data area 204 maps to the specific logical blocks for providing an actual data accessing.

The physical blocks of the spare area 206 are used for substituting the blocks of the data area 204. Therefore, the physical blocks of the spare area 206 are empty blocks or available blocks, namely, no data or data has been marked invalid is stored therein. More particularly, if data is desired to be written to the locations with data written thereon, erasing of the existing data has to be performed first. However, as mentioned above, the page is the minimum writable unit, and the block is the minimum erasable unit. The minimum erasable unit is greater than the minimum writable unit, which represents if the block is desired to be erased, valid pages within the block to be erased have to be copied to the other blocks first. Therefore, when a new data is desired to be written to a physical block M written with data within the data area 204, a physical block S is generally selected from the spare area 206, and then valid old data written on the physical block M is copied to the physical block S and the new data is written to the physical block S. Next, the physical block M is erased and moved to the spare area 206, meanwhile, the physical block S is moved to the data area 204. It should be noted that moving of the physical block M to the spare area 206 and moving of the physical block S to the data area 204 mean that the physical block M is logically moved to the spare area 206 and the physical block S is logically moved to the data area 204. It should be understood by those skilled in the art that logical relationships of the blocks within the data area 204 may be maintained by the logical physical mapping table.

The physical blocks of the special area 202 are used for temporarily storing data to be written into the flash memory 130 by the host 200, and particularly only data with data length thereof being a single accessing unit is temporarily written. In the present embodiment, the accessing unit is one sector. To be specific, as described above, since the pages of the physical blocks of the flash memory 130 of the present embodiment have relatively large storage volumes (for example, the aforementioned 8K bytes), when the valid data in the physical block M is moved to the physical block S, a relatively long time is spent, and therefore a response time for a data writing command may exceed a predetermined time of the flash storage system 100, i.e. a time-out problem is occurred. Therefore, the update data with the date length thereof being the single accessing unit is first written into a physical block of the special area 202, so as to shorten the response time and avoid the time-out. Operation of the physical blocks of the special area 202 will be described in detail with reference of data writing steps of FIG. 3.

Figure 3:
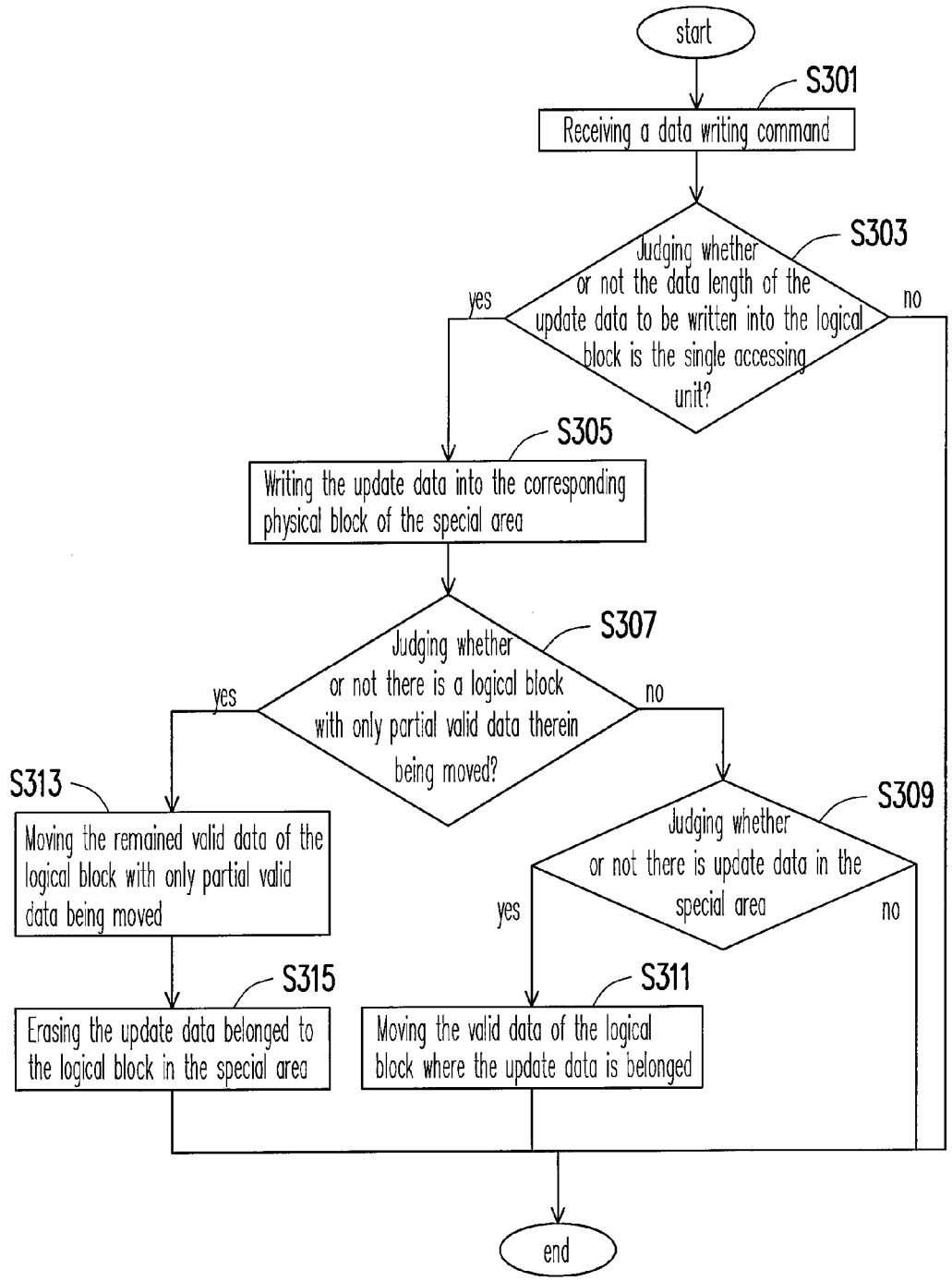
FIG. 3 is a flowchart illustrating data writing steps according to the first embodiment of the present invention.
Figure 4:
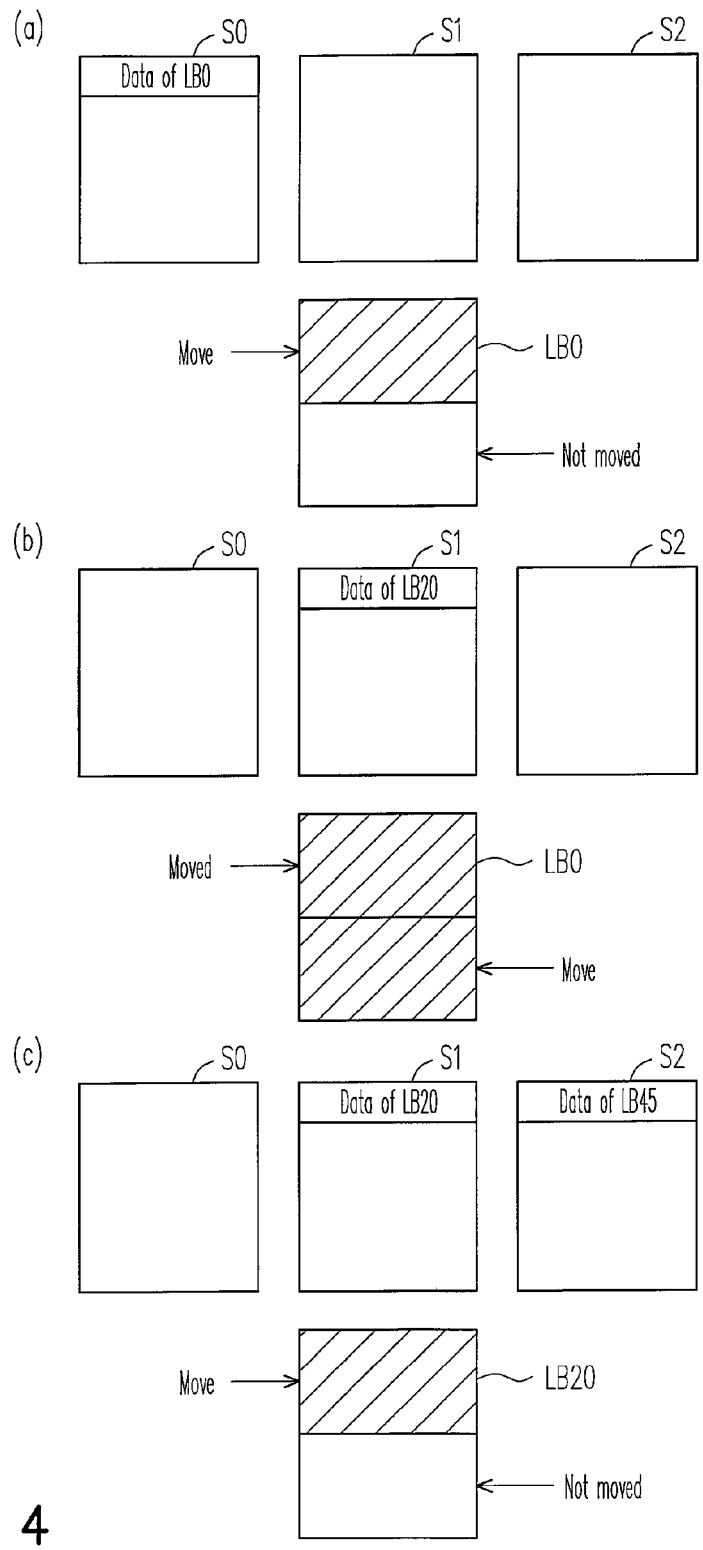
FIG. 4 is a schematic diagram illustrating examples of data writing according to FIG. 3.

FIG. 3 is a flowchart illustrating data writing steps according to the first embodiment of the present invention. FIG. 4 is a schematic diagram illustrating examples of data writing according to FIG. 3. Wherein, (a), (b) and (c) of FIG. 4 respectively represent an operation performed corresponding to each data writing command. For the examples of FIG. 4, it is assumed that the special area 202 includes three physical blocks S0, S1 and S2, and the logical blocks provided by the flash storage system 100 for the host 200 to access include logical blocks LB0~LB59.

It should be noted that when the data length of the update data is not the single accessing unit (i.e. multiple accessing unit), writing of the update data is generally divided into multiple stages according to the accessing unit (i.e. the controller 110 may write data into the flash memory 130 in a unit of the accessing unit and in multiple writing actions). Therefore, moving of the valid data in the original physical block (shown as FIG. 2) may be separated and performed in multiple writing stages, so that there is no system time-out problem for writing the update data with the data length thereof being the multiple accessing units. Accordingly, only a processing method for the update data with the data length thereof being the single accessing unit is described below.

Referring to FIG. 3 and FIG. 4, in step S301, the microprocessor 110a receives the data writing command from the host 200, and provides information of the data writing command to the memory management module 110d. In step S303, the memory management module 110d judges whether or not the data length of the update data to be written into the logical block by the host 200 is the single accessing unit according to the information of the data writing command. If the data length of the update data to be written is judged to be the signal accessing unit in the step S303, the update date is then written into a corresponding physical block of the special area 202 (step S305). For example, if the update data is belonged to the logical blocks LB0~LB19, the update data is then written into the physical block S0 of the special area 202; if the update data is belonged to the logical blocks LB20~LB39, the update data is then written into the physical block S1 of the special area 202; and if the update data is belonged to the logical blocks LB40~LB59, the update data is then written into the physical block S2 of the special area 202. Accordingly, for the example of FIG. 4(a), the data belonged to the logical block LB0 is temporarily written into the physical block S0 of the special area 202.

Next, in step S307, the memory management module 110d judges whether or not the flash storage system 100 has a logical block with only partial valid data therein being moved. Namely, in the step S307, whether or not there is a logical block having remained valid data to be moved is judged.

If it is judged in the step S307 that there is no logical block with only partial valid data therein being moved, in step S309, whether or not there is update data in the special area 202 is then judged.

If it is judged that there is update data in the special area 202 in the step S309, the valid data of the logical block where the update data is belonged is then moved (step S311), wherein only a part of the valid data (for example, a half of the valid data) in the logical block is moved.

For example, it is assumed that there is no logical block with movement of valid data therein being uncompleted, and the special area 202 only has the update data belonged to the logical block LB0, valid data of the logical block LB0 is then moved under control of the memory management module 110d, wherein only a half of the valid data is moved (as shown of FIG. 4(a)).

If it is judged in the step S307 that there is a logical block with only partial valid data therein being moved, the remained valid data therein is then moved, so as to complete movement of all valid data of the logical block (step S313). Next, in step S315, the update data belonged the logical block in the special area 202 is erased.

For example, as shown in example (b) of FIG. 4, when the update data belonged to the logical block LB20 in the follow-up data writing command is written into the physical block S1 of the special area 202, since movement of the valid data of the logical block LB0 is incomplete, the remained valid data therein is then moved. Next, when the data writing command is executed and the update data belonged to the single accessing unit (for example, data belonged to the logical block LB45) is written (as shown in example (c) of FIG. 4), the movement of the valid data for the logical block LB20 is performed. In other words, only a part of the valid data in a logical block is moved in response to each data writing command.

In the present embodiment, the update data in the special area 202 is sequentially selected for moving the valid data of the logical block where the update data is belonged. However, in another embodiment of the present invention, the update data in the physical block of the special area 202 where the most update data is stored may be selected for moving the valid data of the logical block where the update data is belonged. Alternatively, in another embodiment of the present invention, the movement of the valid data of the logical block where the most update data is belonged is first performed. Moreover, moving of the data may be started from a start address of the logical block or from a specific address (for example, an intermediate page of the logical block) of the logical block.

It should be noted that movement of the valid data of the logical block where the update data is belonged is to move the valid data of the physical block mapping to the logical block. For example, a physical block is selected from the spare area 206 to be a new mapping physical block (as shown in FIG. 2) of the logical block mapped to the update data, and valid old data in the data area 204 mapping the logical block and the update data in the special area 202 mapping the logical block are moved to the physical block selected from the spare area 206, wherein only a part of the valid old data and the update data mapping the logical block are moved during a period of executing one data writing command. And, moving of the data may be started from a start address of the logical block or from a specific address (for example, an intermediate page of the logical block) of the logical block. Similarly, the movement operation shown in FIG. 2 may also be performed during erasing of the physical block of the special area 202, and detailed description thereof will not be repeated.

Moreover, in the present embodiment of the present invention, the flash memory 130 is a MLC NAND flash memory, and programming of the blocks of the MLC NAND flash memory may be divided into multiple stages. For example, taking 4 levels cell as example, programming of the blocks is then divided into two stages. A first stage thereof is writing of lower pages having physical characteristics similar to a SLC NAND flash memory, and after the first stage, upper pages are programmed. During the programming, writing speed of the lower page is faster than that of the upper page. Therefore, each of the blocks may be divided into the upper pages and the lower pages. Especially, there is a coupling relation between the upper pages and the lower pages. Namely, if abnormalities are occurred during programming of the upper pages, the corresponding lower pages may be unstable accordingly (i.e. data may be lost). This is why reliability of the MLC NAND flash memory is lower than that of the SLC NAND flash memory. Similarly, in case of 8 levels cell or 16 levels cell, the memory cells may include more pages and programming thereof may be divided into more stages. Here, the page with the fastest writing speed is referred to be the lower page, and the pages with lower writing speed are referred to be the upper pages. For example, the upper pages include a plurality of the pages having different writing speed. Accordingly, in another embodiment of the present invention, the aforementioned data writing steps further include that the update data with the data length thereof being the single accessing unit is only written to the lower page of the physical block of the special area.

Moreover, since in the present embodiment, the valid data of a plurality of the logic blocks are recorded by the physical block of the special area 202, in another embodiment of the present invention, the data writing steps further include recording a mapping relation between the plurality of logical blocks and the specific physical block of the special area in a valid data mapping table, wherein the mapping relation represents a plurality of logical blocks maps to a physical block.

In the present embodiment, the valid data of the logical block are moved separately in two stages. However, the present invention is not limited thereto, as the storage volume of each logical block (or the physical block) becomes greater, the valid data may be moved separately in more stages, so as to avoid the time-out problem.

[Second Embodiment]

In the first embodiment of the present invention, when the physical block of the special area is judged to have the update data, the valid data in the logical block where the update data is belonged is immediately moved. However, the present invention may also be applied to a situation that when the physical block of the special area has multiple update data belonged to the same logical block, the valid data of the same logical block are then moved. In the present invention, a situation that the physical block of the special area has two update data belonged to the same logical block is taken as an example.

Hardware structure of the second embodiment is the same to that of the first embodiment (as shown in FIG. 1 and FIG.

2), and therefore detailed description thereof will not be repeated. A difference between the second embodiment and the first embodiment is that when two update data belonged to the same logical block are judged to be stored in the physical block of the special area 202 according to data writing steps of the second embodiment, the valid data of the logical block where the update data is belonged is then move.

Figure 5:
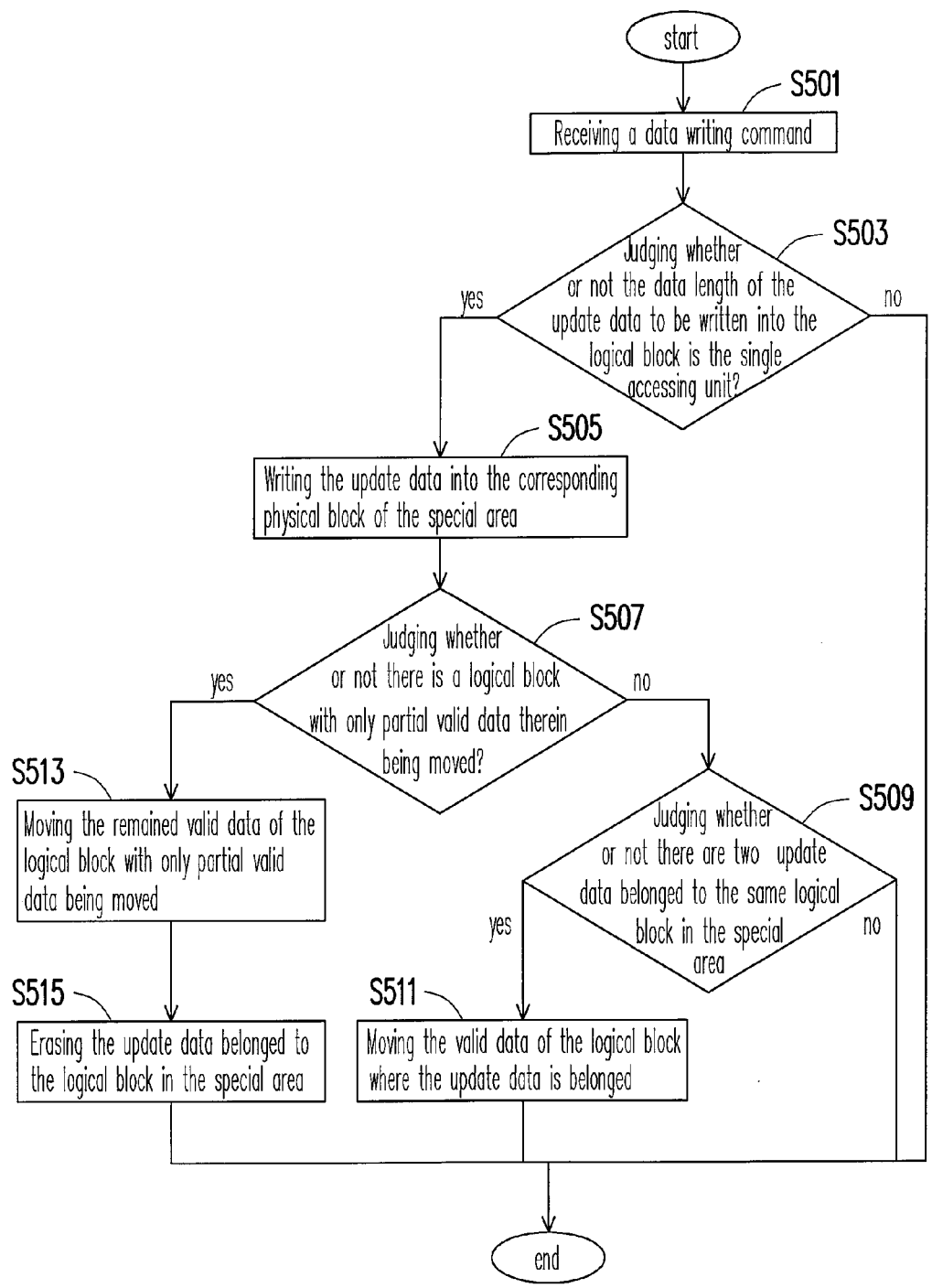
FIG. 5 is a flowchart illustrating data writing steps according to a second embodiment of the present invention.
Figure 6:
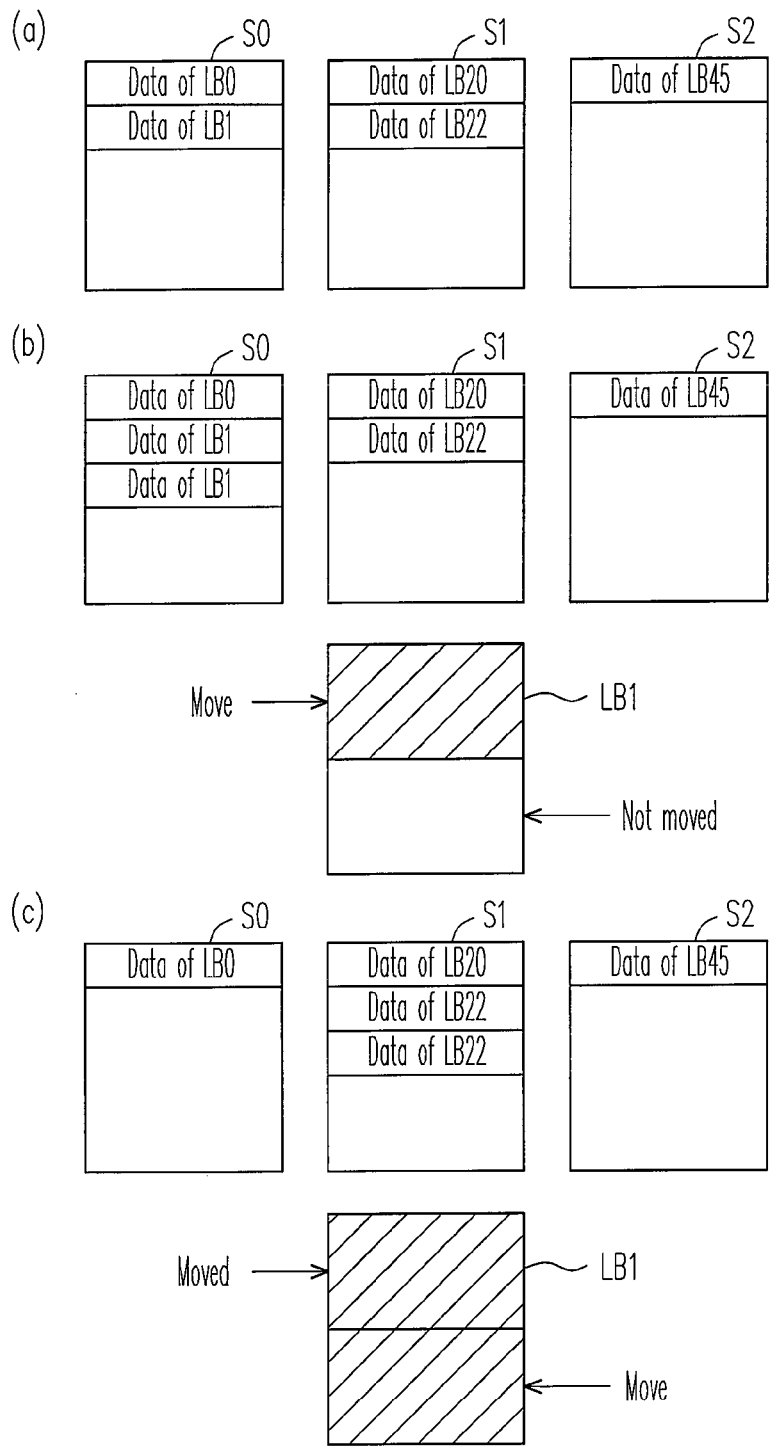
FIG. 6 is a diagram illustrating examples of data writing according to FIG. 5.

FIG. 5 is a flowchart illustrating data writing steps according to a second embodiment of the present invention. FIG. 6 is a diagram illustrating examples of data writing according to FIG. 5, wherein (a) of FIG. 6 represents a state of data stored in the special area 202, and (b) and (c) of FIG. 4 respectively represent an operation performed corresponding to each data writing command. Examples of FIG. 6 are similar to that of FIG. 4, and it is assumed the special area 202 includes three physical blocks S0, S1 and S2, and the logical blocks provided by the flash storage system 100 for the host 200 to access includes logical blocks LB0~LB59.

Similar to the aforementioned description, only a processing method for the update data with the data length thereof being the single accessing unit is described below.

Referring to FIG. 5 and FIG. 6, in step S501, the microprocessor 110a receives the data writing command from the host 200, and provides information of the data writing command to the memory management module 110d. In step S503, the memory management module 110d judges whether or not the data length of the update data to be written into the logical block by the host 200 is the single accessing unit according to the information of the data writing command. If the data length of the update data to be written is judged to be the signal accessing unit in the step S503, the update date is then written into a corresponding physical block of the special area 202 (step S505). For example, if the update data is belonged to the logical blocks LB0~LB19, the update data is then written into the physical block S0 of the special area 202; if the update data is belonged to the logical blocks LB20~LB39, the update data is then written into the physical block S1 of the special area 202; and if the update data is belonged to the logical blocks LB40~LB59, the update data is then written into the physical block S2 of the special area 202.

Referring to the examples of FIG. 6, it is assumed the update data belonged to the logical blocks LB0, LB1, LB20, LB22 and LB45 have respectively written into the physical blocks S0, S1 and S2 of the special area 202 (shown as (a) of FIG. 6). Next, shown as (b) of FIG. 6, data belonged to the logical block LB1 is temporarily written into the physical block S0 of the special area 202.

Next, in step S507, the memory management module 110d judges whether or not the flash storage system 100 has a logical block with only partial valid data therein being moved.

If it is judged in the step S507 that there is no logical block with only partial valid data therein being moved, in step S509, whether or not there are two update data belonged to the same logical block in the special area 202 is then judged.

If it is judged in the S509 that there are two update data belonged to the same logical block in the special area 202, the valid data of the logical block where the two update data is belonged is then moved (step S511), wherein only a part of the valid data (for example, a half of the valid data) in the logical block is moved.

For example, shown as (b) of FIG. 6, there are two update data belonged to the logical block LB1 in the special area 202. Therefore, the valid data of the logical block LB1 is moved under control of the memory management module 110d, wherein only a half of the valid data is moved.

If it is judged in the step S507 that there is a logical block with only partial valid data therein being moved, the remained valid data therein is then moved, so as to complete movement of all valid data of the logical block (step S513). Next, in step S515, the update data belonged the logical block in the special area 202 is then erased.

For example, shown as (c) of FIG. 6, when the update data belonged to the logical block LB22 in the follow-up data writing command is written into the physical block S1 of the special area 202, since movement of the valid data of the logical block LB1 is incomplete, the remained valid data of the logical block LB0 is then moved. Next, when a next data writing command is performed and update data belonged to the single accessing unit is written, the movement of the valid data for the logical block LB20 is performed. In other words, only a part of the valid data in a logical block is moved in response to each data writing command. Wherein, moving of the data may be started from a start address of the logical block or from a specific address (for example, an intermediate page of the logical block) of the logical block.

Similar to the aforementioned description, operations of moving the valid data of the logical block where the update data is belonged and erasing of the physical block of the special area 202 are similar to that of the first embodiment, and therefore detailed description thereof will not be repeated.

In the present embodiment of the invention, two update data belonged to the same logical block in the special area 202 is sequentially selected for moving the valid data of the logical block where the two update data is belonged. However, in another embodiment of the present invention, the two update data belonged to the same logical block in the physical block of the special area 202 where the most update data is stored may be selected for moving the valid data of the logical block where the update data is belonged. Moreover, though the valid data of the logical block written with two update data are moved, the present invention is not limited thereto, and the valid data of the same logical block where three or more update data are belonged may also be moved according to the spirit of the present invention.

In summary, according to the data writing steps of the present invention, when the data length of the update data is the single accessing unit, the update data may be directly written into the physical block of the special area 202, and only a part of the valid data of the logical block is moved. Therefore, data writing operation of the flash storage system 100 may be quickly completed, and a response time thereof is within the predetermined time, so that the time-out problem is avoided. Accordingly, according to the data writing steps of the present invention, the flash memory with large volume pages may be applied to the flash storage system to satisfy a demand of large storage volume while the time-out problem is avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method, for writing data from a host to a flash memory of a flash storage system, wherein the flash memory is divided into a plurality of physical blocks for alternately mapping a plurality of logical blocks provided by the flash storage system for the host to access, the data writing method comprising:

logically dividing the plurality of physical blocks of the flash memory into a data area, a spare area and a special area;

judging whether update data to be written into the plurality of logical blocks by the host is a single accessing unit according to a data writing command received from the host;

writing the update data into a corresponding physical block among the physical blocks of the special area if the update data is the single accessing unit;

judging whether the physical blocks of the special area have stored at least one other data;

if the update data is the single accessing unit and the physical blocks of the special area have stored the at least one other data, selecting data to be merged from the update data and the at least one other data, selecting a physical block from the spare area to be a new mapping physical block for a target logical block mapping to the data to be merged, moving valid old data belonging to the target logical block in the data area and the data to be merged in the special area to the new mapping physical block, wherein only a part of the data to be merged and the valid old data belonging to the target logical block are moved when the host performs the data writing command; and erasing the merged data belonging to the target logical block from the physical blocks of the special area after all of the valid old data and the merged data belonging to the target logical block are moved into the new mapping physical block for the target logical block.

2. The data writing method as claimed in claim 1, wherein the step of selecting the data to be merged from the update data and the at least one other data comprises:

sequentially selecting data from the physical blocks of the special area as the data to be merged.

3. The data writing method as claimed in claim 1, further comprising:

judging whether there is data belonging to a logical block mapping to the update data in the at least one other data;

if there is the data belonging to the logical block mapping to the update data in the at least one other data, the step of selecting the data to be merged from the update data and the at least one other data comprises: selecting the update data and the data belonging to the logical block mapping to the update data in the at least one other data as the data to be merged.

4. The data writing method as claimed in claim 1, wherein the step of writing the update data to the corresponding physical block among the physical blocks of the special area further comprising:

only writing the update data into a lower page of the corresponding physical block when the flash memory is a multi level cell (MLC) NAND flash memory.

5. The data writing method as claimed in claim 1, wherein the single accessing unit is a sector.

6. The data writing method as claimed in claim 1, further comprising recording a mapping relation between the plurality of logical blocks and the corresponding physical block in a valid data mapping table, wherein the mapping relation represents the plurality of logical blocks map to the corresponding physical block.

7. The data writing method as claimed in claim 1, wherein the step of moving valid old data belonging to the target logical block in the data area and the data to be merged in the special area to the new mapping physical block is starting from a start address of the target logical block or a specific address of the target logical block.

8. A controller, for controlling a flash memory of a flash storage system, wherein the flash memory is divided into a plurality of physical blocks for alternately mapping a plurality of logical blocks provided by the flash storage system for a host to access, the controller comprising:

a microprocessor, for receiving a data writing command from the host;

a buffer memory, coupled to the microprocessor for temporarily storing data;

a flash memory interface, coupled to the microprocessor, for accessing the flash memory; and a memory management module, coupled to the microprocessor, for executing a plurality of data writing steps, the data writing steps comprising:

logically dividing the plurality of physical blocks of the flash memory into a data area, a spare area and a special area;

judging whether update data to be written into the plurality of logical blocks by the host is a single accessing unit according to the data writing command;

writing the update data into a corresponding physical block among the physical blocks of the special area via the flash memory interface if the update data is the single accessing unit;

judging whether the physical blocks of the special area have stored at least one other data;

if the update data is the single accessing unit and the physical blocks of the special area have stored the at least one other data, selecting data to be merged from the update data and the at least one other data, selecting a physical block from the spare area to be a new mapping physical block for a target logical block mapping to the data to be merged, moving valid old data belonging to the target logical block in the data area and the data to be merged in the special area to the new mapping physical block, wherein only a part of the data to be merged and the valid old data belonging to the target logical block are moved when the host performs the data writing command; and erasing the merged data belonging to the target logical block from the physical blocks of the special area after all of the valid old data and the merged data belonging to the target logical block are moved into the new mapping physical block for the target logical block.

9. The controller as claimed in claim 8, wherein the step of selecting the data to be merged from the update data and the at least one other data comprises:

sequentially selecting data from the physical blocks of the special area as the data to be merged.

10. The controller as claimed in claim 8, wherein the data writing steps further comprise:

judging whether there is data belonging to a logical block mapping to the update data in the at least one other data;

if there is the data belonging to the logical block mapping to the update data in the at least one other data, the step of selecting the data to be merged from the update data and the at least one other data comprises: selecting the update data and the data belonging to the logical block mapping to the update data in the at least one other data as the data to be merged.

11. The controller as claimed in claim 8, wherein the flash memory is a single level cell (SLC) NAND flash memory or a multi level cell (MLC) NAND flash memory.

12. The controller as claimed in claim 8, wherein the data writing steps further comprise:

only writing the update data into a lower page of the corresponding physical block when the flash memory is a multi level cell (MLC) NAND flash memory.

13. The controller as claimed in claim 8, wherein the flash memory flash storage system is a flash drive, a memory card or a solid state drive (SSD).

14. The controller as claimed in claim 8, wherein the data writing steps further comprise recording a mapping relation between the plurality of logical blocks and the corresponding physical block in a valid data mapping table, wherein the mapping relation represents the plurality of logical blocks map to the corresponding physical block.

15. The controller as claimed in claim 8, wherein the step of moving valid old data belonging to the target logical block in the data area and the data to be merged in the special area to the new mapping physical block is starting from a start address of the target logical block, or from a specific address of the target logical block.

16. A flash storage system, comprising:
   a transmission interface, for connecting a host;
   a flash memory, having a plurality of physical blocks for alternately mapping a plurality of logical blocks provided for the host to access; and
   a controller, coupled to the transmission interface and the flash memory for executing a plurality of data writing steps, the data writing steps comprising:
   logically dividing the plurality of physical blocks of the flash memory into a data area, a spare area and a special area;
   judging whether update data to be written into the plurality of logical blocks by the host is a single accessing unit according to a data writing command received from the host;
   writing the update data into a corresponding physical block among the physical blocks of the special area if the update data is the single accessing unit;
   judging whether the physical blocks of the special area have stored at least one other data;
   if the update data is the single accessing unit and the physical blocks of the special area have stored the at least one other data, selecting data to be merged from the update data and the at least one other data, selecting a physical block from the spare area to be a new mapping physical block for a target logical block mapping to the data to be merged, moving valid old data belonging to the target logical block in the data area and the data to be merged in the special area to the new mapping physical block, wherein only a part of the data to be merged and the valid old data belonging to the target logical block are moved when the host performs the data writing command; and
   erasing the merged data belonging to the target logical block from the physical blocks of the special area after all of the valid old data and the merged data belonging to the target logical block are moved into the new mapping physical block for the target logical block.

17. The flash storage system as claimed in claim 16, wherein the step of selecting the data to be merged from the update data and the at least one other data comprises:
   sequentially selecting data from the physical blocks of the special area as the data to be merged.

18. The flash storage system as claimed in claim 16, wherein the data writing steps further comprise:
   judging whether there is data belonging to a logical block mapping to the update data in the at least one other data;
   if there is the data belonging to the logical block mapping to the update data in the at least one other data, the step of selecting the data to be merged from the update data and the at least one other data comprises: selecting the update data and the data belonging to the logical block mapping to the update data in the at least one other data as the data to be merged.

19. The flash storage system as claimed in claim 16, wherein the flash memory is a single level cell (SLC) NAND flash memory or a multi level cell (MLC) NAND flash memory.

20. The flash storage system as claimed in claim 16, wherein the data writing steps further comprise:
   only writing the update data into a lower page of the corresponding physical block when the flash memory is a multi level cell (MLC) NAND flash memory.

21. The flash storage system as claimed in claim 16, wherein the transmission interface is a PCI express interface, a USB interface, an IEEE 1394 interface, an SATA interface, an MS interface, an MMC interface, an SD interface, a CF interface or an IDE interface.

22. The flash storage system as claimed in claim 16, wherein the data writing steps further comprise recording a mapping relation between the plurality of logical blocks and the corresponding physical block in a valid data mapping table, wherein the mapping relation represents the plurality of logical blocks map to the corresponding physical block.

23. The flash storage system as claimed in claim 16, wherein the step of moving valid old data belonging to the target logical block in the data area and the data to be merged in the special area to the new mapping physical block is starting from a start address of the target logical block, or from a specific address of the target logical block.

* * * * *